June 18, 1940.  M. P. WRIGHT  2,204,641
NOTE FINDER
Filed Sept. 2, 1937  2 Sheets-Sheet 1
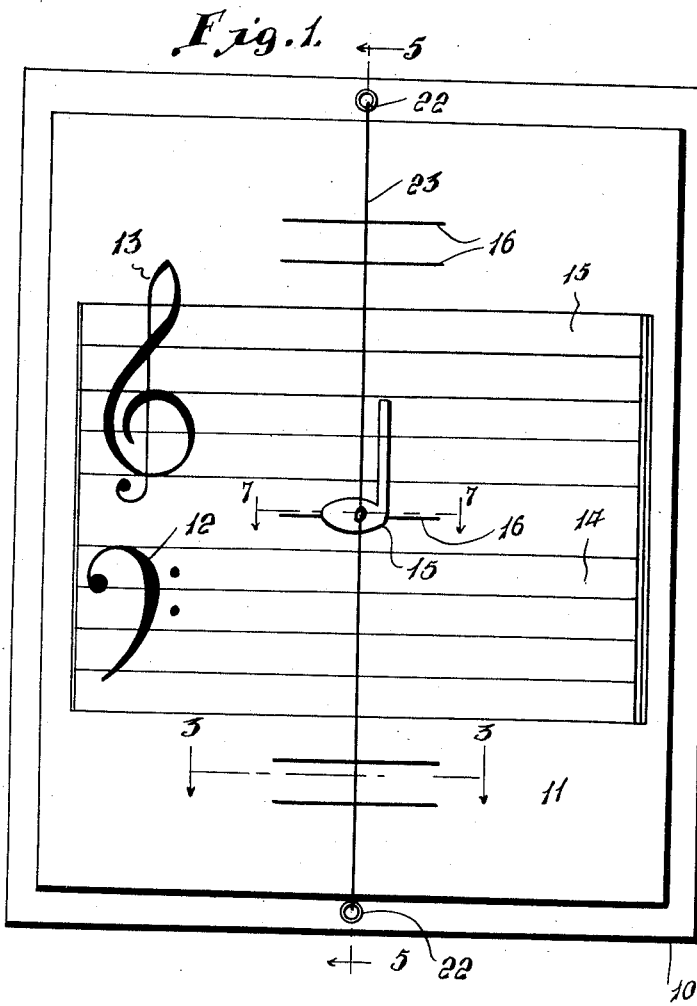
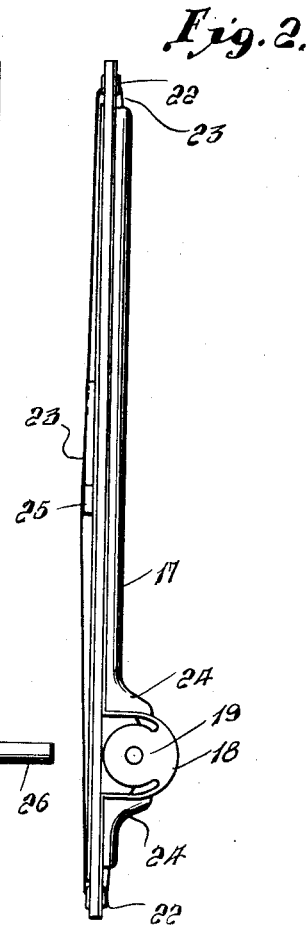
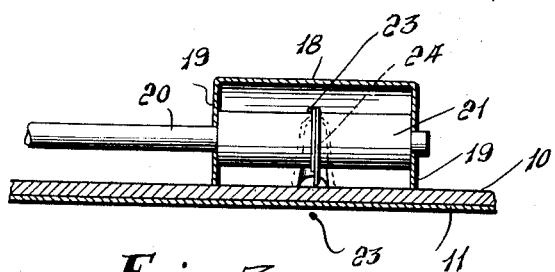
Inventor
Milo P. Wright.
By L. F. Randolph
Attorney

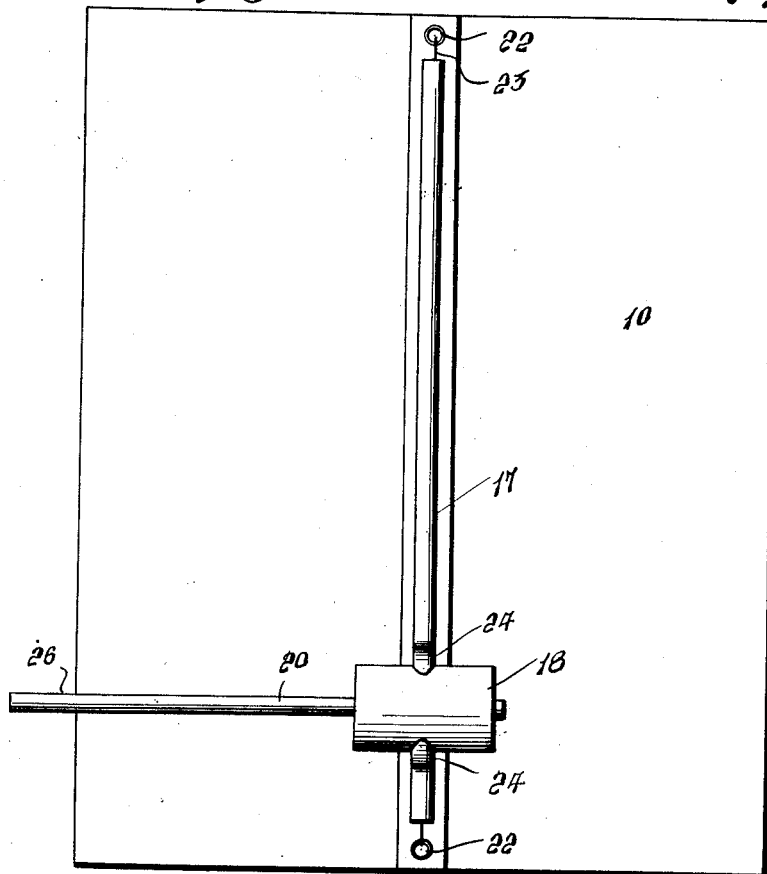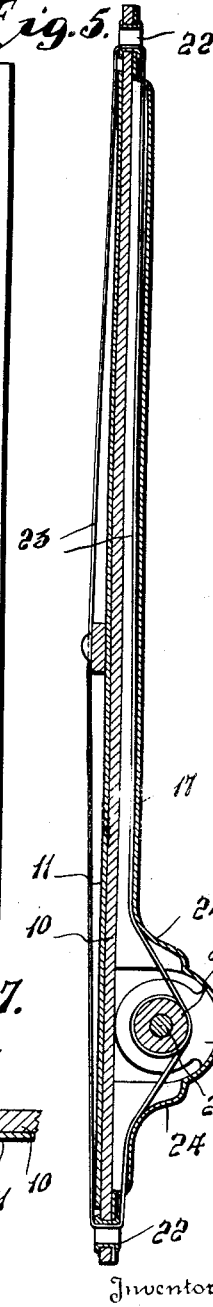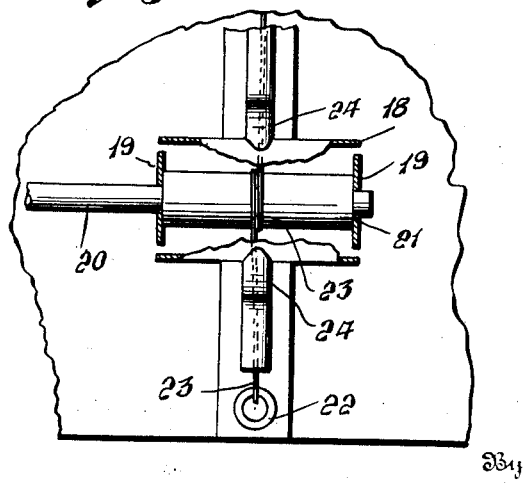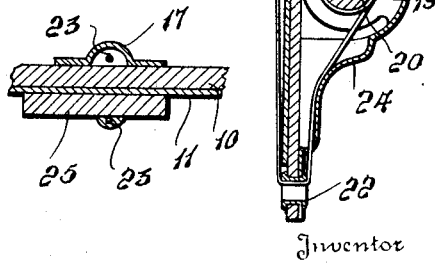

Patented June 18, 1940

2,204,641

UNITED STATES PATENT OFFICE 2,204,641

NOTE FINDER

Milo P. Wright, Bucklin, Kans.

Application September 2, 1937, Serial No. 162,203

2 Claims. (Cl. 84—471)

This invention relates to a note finder for use in teaching musical notation.

An important object of this invention is to provide a manually operated device for teaching musical notation, which will be light and convenient to handle and which can be conveniently carried around and will require no structure to support it when in use; which will be of very simple construction that it can be easily operated by a child and which embodies no complicated mechanism to be damaged by a child's use.

Another object of the invention is to provide a device that will be inexpensive to manufacture thereby facilitating its wide use by pupils which will greatly lessen the burden in teaching and which will tend to increase the child's interest in the study of music due to the fact that the device can be manually operated by the pupil.

A further advantage of the invention resides in the stability and durability resulting from the compactness and arrangement of the elements forming the device.

Other objects and advantages of the invention will hereafter become more fully apparent from the following specification of which the drawings form a part, and wherein:

Figure 1 is a top plan view of the invention;

Figure 2 is a side elevational view of the same;

Figure 3 is a cross sectional view on the line 3—3 of Figure 1;

Figure 4 is a bottom plan view of the invention;

Figure 5 is a sectional view on the line 5—5 of Figure 1;

Figure 6 is a fragmentary elevational view partly in section showing the endless conveyor trained over the reel; and Figure 7 is a cross sectional view on the line 7—7 of Figure 1.

Referring more particularly to the drawings wherein like reference characters designate like or corresponding parts throughout, 10 designates generally the panel to one face of which is secured the chart 11 on which is printed or otherwise inscribed the bass clef 12, and the treble clef 13. The bass and treble clefs 12 and 13 respectively are provided with the usual staffs 14 and 15 respectively and the ledger lines 16 combining to form the grand staff.

Secured to the opposite side of the panel 10 is a channel shaped member 17 which is provided adjacent one end with an enlarged portion 18 having inwardly extending perforated ears 19 forming bearings to which is journaled a shaft 20.

Keyed to the shaft 20 and mounted between ears 19 is a reel 21.

At the top and bottom of panel 10 and adjacent each end of the channel member 17 are provided eyelets 22 which extend through panel 10 to form guides for an endless cord 23 which passes over the chart 11 and through the channel member 17 and which is trained over the reel 21. The eyelets 22 and channel member 17 guide the movement of the endless cord 23, and the inclined groove portions 24 connecting the channel member 17 and the enlarged portion 18 guide the cord 23 as it moves on to and off of the reel 21. Secured to the cord 23 is a note shaped member 25 which rests on the chart 11 and which is adapted to be moved over the chart by the movement of cord 23.

The free end of shaft 20 extends beyond the edge of panel 10 and forms a finger grip 26, by rotation of which the reel 21 is revolved to move the note member 25 up or down on the chart depending upon the direction of rotation of shaft 20 and reel 21.

From the foregoing it will be obvious that by rotating the finger grip portion 26 in one direction, the element 25 will be caused to move from its position as shown in Figure 1 to a space or line above, or by rotation in the opposite direction member 25 will move downwardly to rest on a space or line below.

The device may be used by the instructor with the pupil naming the line or space to which the note 25 is moved, or by sounding the various notes as indicated by the position of element 25. Conversely, the pupil may operate the device indicating with the member 25 the notes sounded or named by the instructor. In this way the interest in learning to the child pupil will be increased.

It is to be understood that the preferred embodiment of the invention only has been herein described, the right being reserved to make such changes and modifications in the construction and operation as will not depart from the spirit and scope of the invention.

I claim as my invention:

1. A portable and manually operated music chart comprising in combination, with a panel having a musical chart mounted on one side thereof, a channel shaped portion extending along the opposite side, said channel shaped portion being provided with an enlarged transverse portion, said enlarged portion being provided with inwardly extending ears at its ends, a shaft journaled in said ears, a reel keyed to said shaft and mounted between said ears, eyelets mounted in said panel adjacent the ends of said channel portion, a flexible conveyor extending across the opposite sides of said panel and trained over said reel, said channel portion and eyelets forming guides for said flexible conveyor, and a note shaped element slidable over the music chart on said panel, said member being connected to said cord and operated by the manual rotation of said shaft.

2. In a device of the class described, a panel having a music chart secured to one side thereof and having openings adjacent its upper and lower edges, a channel shaped member extending along the other side of said panel between said openings, said channel shaped member being enlarged adjacent its lower end to form a housing, a spool journaled in the housing, an operating member keyed to said spool and extending outwardly beyond one side of the panel, a flexible conveyor extending along both sides of said panel, through said channel member, and through said openings, said cord being trained over said spool to be actuated thereby, and a note shaped element secured to said cord and movable thereby relatively to the music chart.

MILO P. WRIGHT.